(12) United States Patent
Zhang et al.

(10) Patent No.: US 9,392,577 B2
(45) Date of Patent: Jul. 12, 2016

(54) SMALL CELL EVOLVED MULTIMEDIA BROADCAST MULTICAST SERVICE

(71) Applicant: QUALCOMM Incorporated, San Diego, CA (US)

(72) Inventors: Xiaoxia Zhang, San Diego, CA (US); Jun Wang, Poway, CA (US); Durga Prasad Malladi, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 14/192,566

(22) Filed: Feb. 27, 2014

(65) Prior Publication Data

US 2014/0247766 A1 Sep. 4, 2014

Related U.S. Application Data

(60) Provisional application No. 61/771,726, filed on Mar. 1, 2013.

(51) Int. Cl.
| | |
|---|---|
| *H04W 4/00* | (2009.01) |
| *H04W 72/00* | (2009.01) |
| *H04W 52/24* | (2009.01) |
| *H04W 52/14* | (2009.01) |
| *H04W 52/32* | (2009.01) |

(52) U.S. Cl.
CPC .......... *H04W 72/005* (2013.01); *H04W 52/143* (2013.01); *H04W 52/244* (2013.01); *H04W 52/327* (2013.01); *H04W 52/241* (2013.01); *H04W 52/245* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2009/0252075 | A1 | 10/2009 | Ji et al. |
| 2010/0323745 | A1 | 12/2010 | Chen et al. |
| 2011/0128903 | A1* | 6/2011 | Futaki et al. ................. 370/312 |
| 2013/0258934 | A1* | 10/2013 | Amerga et al. ............... 370/312 |
| 2014/0169255 | A1* | 6/2014 | Zhang et al. ................. 370/312 |
| 2014/0243002 | A1* | 8/2014 | Muruganathan et al. ..... 455/450 |

FOREIGN PATENT DOCUMENTS

| | | |
|---|---|---|
| EP | 2299739 A1 | 3/2011 |
| WO | 2013005904 A1 | 1/2013 |

OTHER PUBLICATIONS

International Search Report and Written Opinion—PCT/US2014/019642—ISA/EPO—Aug. 8, 2014.

* cited by examiner

*Primary Examiner* — Frank Duong
(74) *Attorney, Agent, or Firm* — Harrity & Harrity, LLP

(57) ABSTRACT

A method by a small cell for wireless communication may include receiving, by the small cell, a wireless Multicast-Broadcast Single Frequency Network (MBSFN) signal from a macro cell, wherein the small cell is characterized by having a transmit power substantially less than each macro cell in a wireless communication network with the small cell. The method may further include obtaining, by the small cell, a measurement value of the MBSFN signal within a radio range of the small cell. The method may further include acting, by the small cell, based on the measurement value. The small cell may be, or may include, at least one of a pico cell, a femto cell, or a home evolved Node B (HeNB).

24 Claims, 14 Drawing Sheets

LCT Cell OFF State
No Transmissions in Downlink
No Reception in Uplink

LCT Cell DORMANT State
No Transmissions in Downlink
Sparse Reception in Uplink (Neighbor cell UE PRACH, PUCCH or SRS)

LCT Cell ACTIVE State
Common Signals in Downlink
PSS, SSS in every fifth subframe
PBCH in every tenth subframe
SIB1 in every twentieth subframe
Common RS in all subframes

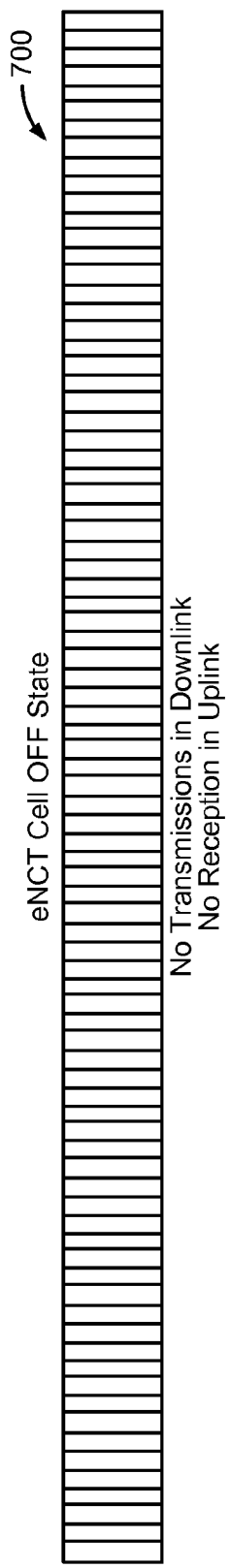

eNCT Cell OFF State

No Transmissions in Downlink
No Reception in Uplink

FIG. 7

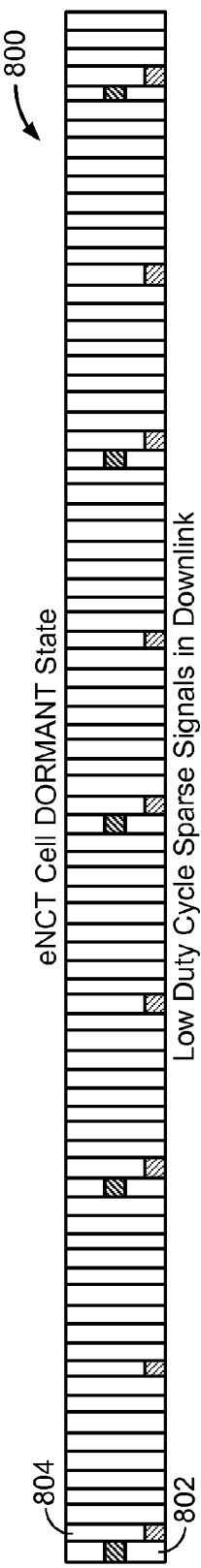

eNCT Cell DORMANT State

Low Duty Cycle Sparse Signals in Downlink
Uplink reception (PRACH) from all Connected UEs and Rel-12 Idle UEs
Example: PSS, SSS, PBCH, Narrowband RS, SIB0 in every 200th subframe

FIG. 8

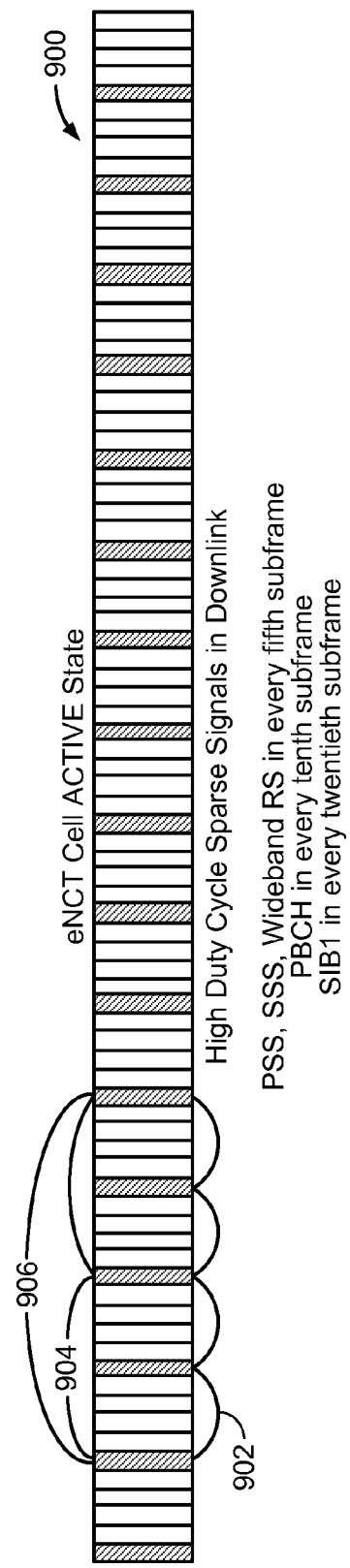

eNCT Cell ACTIVE State

High Duty Cycle Sparse Signals in Downlink
PSS, SSS, Wideband RS in every fifth subframe
PBCH in every tenth subframe
SIB1 in every twentieth subframe

FIG. 9

SMALL CELL EVOLVED MULTIMEDIA BROADCAST MULTICAST SERVICE

CROSS-REFERENCE TO RELATED APPLICATION

This application claims priority under 35 U.S.C. 119(e) to provisional application Ser. No. 61/771,726 filed Mar. 1, 2013, which application is incorporated by reference herein, in its entirety.

FIELD

Aspects of the present disclosure relate generally to wireless communication systems, and more particularly, to managing implementation of Evolved Multimedia Broadcast Multicast Service (eMBMS) involving small cells of a wireless network.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) advanced cellular technology as an evolution of Global System for Mobile communications (GSM) and Universal Mobile Telecommunications System (UMTS). The LTE physical layer (PHY) provides an efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

In broadcast operation, several eNBs in a broadcast area broadcast signals in a synchronized fashion, carrying information that can be received and accessed by any subscriber UE in the broadcast area. The generality of broadcast operation enables greater efficiency in transmitting information of general public interest, for example, event-related multimedia broadcasts. As the demand and system capability for event-related multimedia and other broadcast services has increased, system operators have shown increasing interest in making use of broadcast operation in 3GPP networks. At the same time, wireless networks have seen increasing addition of small, low-power cells such as femto cells and pico cells. Broadcasting eMBMS signals from small cells may raise issues in wireless networks involving handover, idle mode behavior, and related small cell eMBMS management issues.

SUMMARY

Methods, apparatus and systems for managing implementation of eMBMS involving small cells of a wireless network, are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method by a small cell for wireless communication may include receiving, by the small cell, a wireless Multicast-Broadcast Single Frequency Network (MBSFN) signal from a macro cell, wherein the small cell is characterized by having a transmit power substantially less than each macro cell in a wireless communication network with the small cell. The method may further include obtaining, by the small cell, a measurement value of the MBSFN signal within a radio range of the small cell. The method may further include acting, by the small cell, based on the measurement value. The small cell may be, or may include, at least one of a pico cell, a femto cell, or a home evolved Node B (HeNB).

In an aspect, the obtaining may be performed by measuring a metric of the MBSFN signal as received at the small cell. For example, the metric may be selected from Reference Signal Received Power (RSRP), Reference Signal Received Quality (RSRQ), or Signal-to-Noise Ratio (SNR).

In another aspect, the obtaining may be performed by receiving information from a user equipment (UE) in radio range of the small cell. In such case, the information may include a report indicating at least one of: a UE interest in an MBSFN service, or an MBSFN signal strength. The information may be received by the small cell, for example, via a Physical Random Access Channel (PRACH) signal from the UE. In an aspect, the UE may provide the information only if an MBSFN signal strength measured by the UE is less than a threshold value.

In another aspect, the acting by the small cell based on the measurement value may include setting a transmit power for transmitting the MBSFN signal from the small cell. For example, setting the transmit power may include ramping up the transmit power based on a number of contiguous MBSFN subframes to be transmitted from the small cell.

In an alternative aspect, or in addition, the acting may include determining whether to transmit an MBSFN signal from the small cell. Performing the determining whether to transmit an MBSFN signal may be further based, for example, on whether the small cell is transmitting a unicast signal. When the small cell is transmitting, or about to transmit the MBSFN signal, the method may further include reporting at least one of MBSFN transmission status, MBSFN transmit power, and unicast transmission status of the small cell to a Multicast Coordinating Entity (MCE). Accordingly, in another aspect of the method, the MCE may determine a data rate Modulation and Coding Scheme (MCS)

for the MBSFN signal based at least in part on whether the small cell is transmitting a unicast signal.

In an alternative aspect, or in addition, the acting may be further based on a data quality requirement for the MBSFN signal. In such cases, the method may further include determining the data quality requirement based on a data rate Modulation and Coding Scheme (MCS) used in the MBSFN signal. In an alternative, or in addition, the method may include determining the data quality requirement based on a data rate Modulation and Coding Scheme (MCS) used by a user equipment (UE) receiving the MBSFN signal within radio range of the small cell. In an aspect, the method may include modulating power of MBSFN symbols transmitted by the small cell based on the data quality requirement.

In another aspect, a method by a mobile entity for wireless communication may include receiving, by a mobile entity from a network, at least one of frequency information or cell ID information for at least one of a macro cell or frequency or a small cell supporting an MBMS service. The method may include receiving user interest information indicating user interest in a service. The method may further include prioritizing, by the mobile entity, the macro cell or frequency for cell reselection based on the user interest information indicating interest in the MBMS service. In an aspect, the mobile entity may be in an idle state.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a mobile entity, for example a mobile entity or access terminal. In other embodiments, aspects of the technology may be implemented in a network entity, such as, for example, a base station, eNB, picocell, femtocell or Home Node B, and particularly in a small cell. In some aspects, a mobile entity and network entity may operate interactively to perform aspects of the technology as described herein. Similarly, an article of manufacture may be provided, including a computer-readable storage medium holding encoded instructions, which when executed by a processor, cause a network entity or access terminal to perform the methods and aspects of the methods as summarized above.

BRIEF DESCRIPTION OF THE DRAWINGS

FIGS. 7-9 illustrate downlink frames in respective off, dormant and active states of an enhanced new carrier type (eNCT) small cell.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
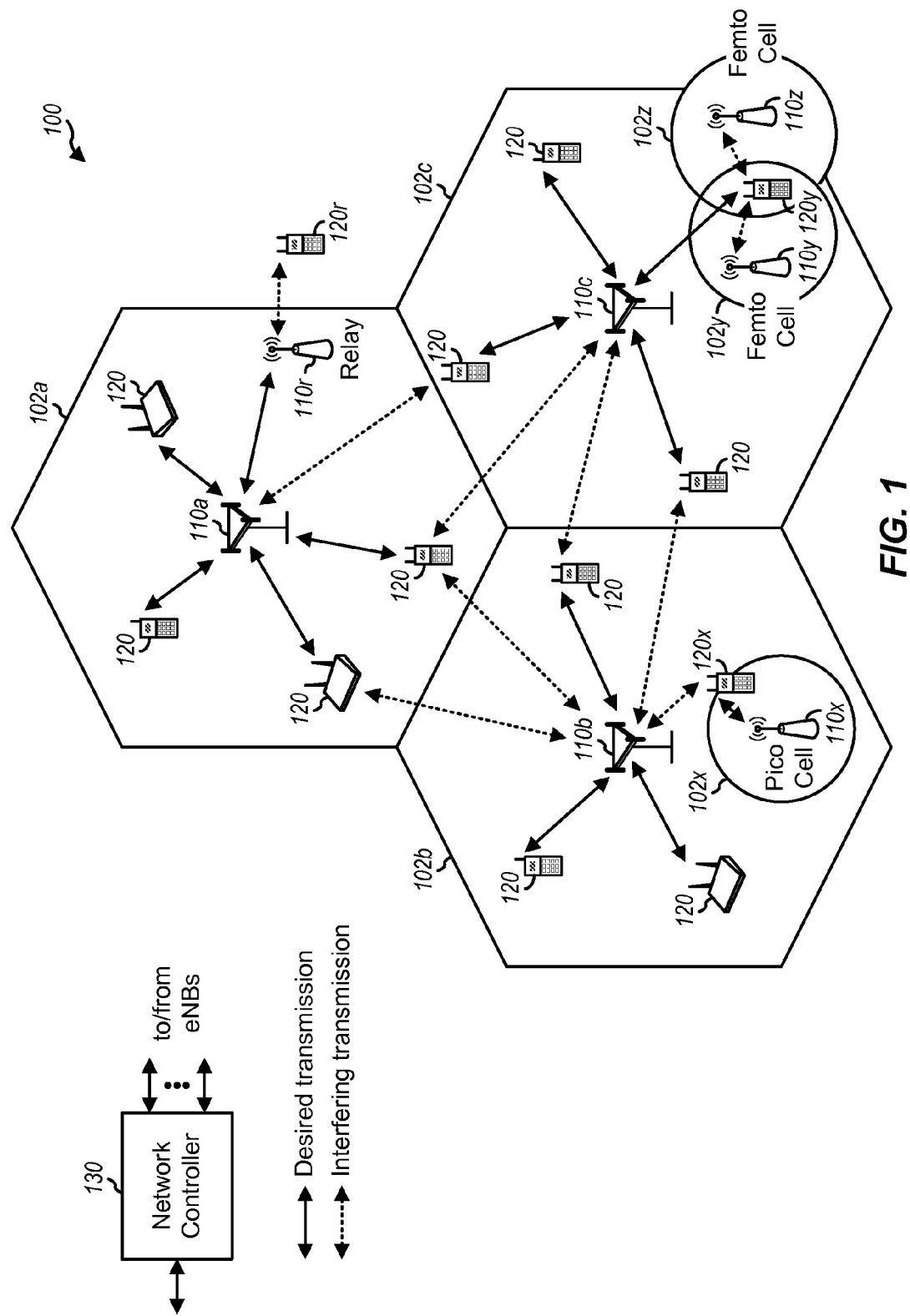
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 1100y and 110z may be femto eNBs for the femto cells 102y and 102z, respectively. An eNB may support one or multiple (e.g. three) cells. The femto cells and pico cells are examples of small cells. As used herein, a small cell means a cell characterized by having a transmit power substantially less than each macro cell in the network with the small cell, for example low-power access nodes such as defined in 3GPP Technical Report (T.R.) 36.932 section 4.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g. macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 5 to 20 Watts) whereas pico eNBs, femto eNBs and relays may have a lower transmit power level (e.g., 0.1 to 2 Watts).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, a smart phone, etc. A UE may be a cellular phone, a personal digital assistant (PDA), a wireless modem, a wireless communication device, a handheld device, a laptop computer, a cordless phone, a wireless local loop (WLL) station, or other mobile entity. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which may also be referred to as tones or bins. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
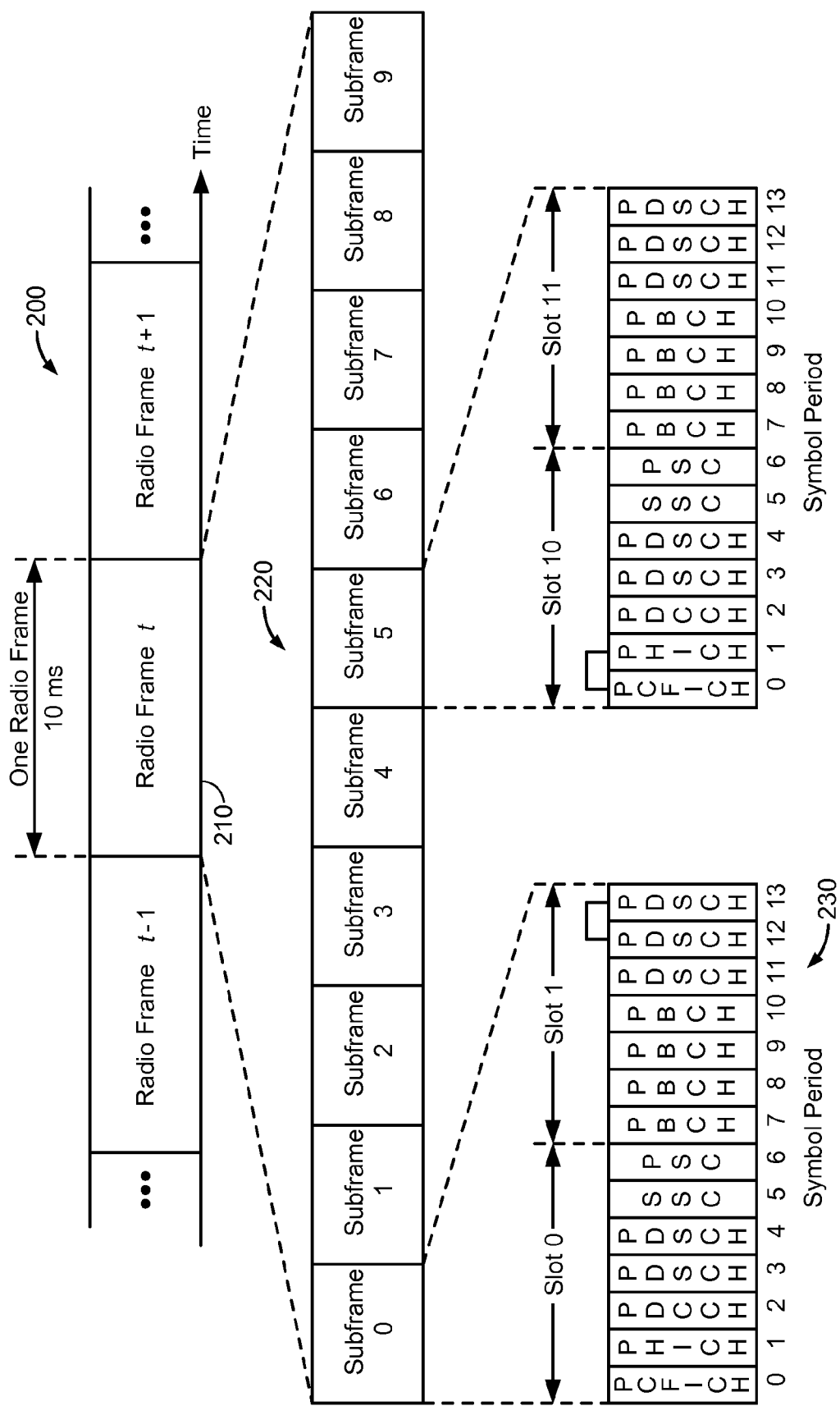
FIG. 2 is a block diagram conceptually illustrating an example of a down link frame structure in a telecommunications system.
Figure 6:
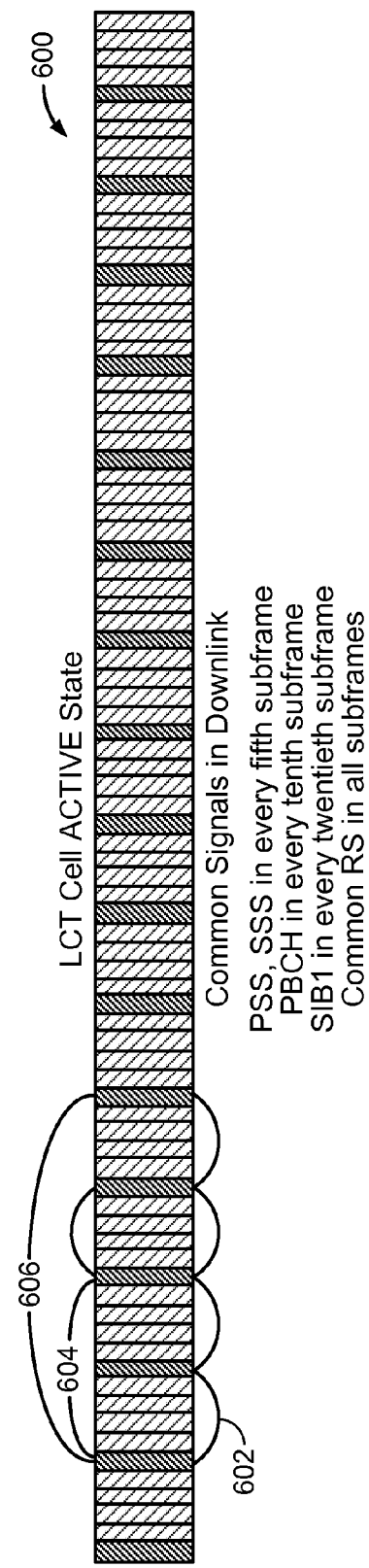

FIG. 2 shows a down link frame structure 200 used in LTE. The transmission timeline for the downlink may be partitioned into units of radio frames. Each radio frame 210 may have a predetermined duration (e.g., 10 milliseconds (ms)) and may be partitioned into 10 subframes 220 with indices of 0 through 9. Each subframe may include two slots. Each radio frame may thus include 20 slots 230 with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g. 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), or other parameter. In an aspect, cell reselection may be prioritized based on whether or not an eNB is a macro cell and whether or not it is broadcasting an MBMS service of interest to the user.

Figure 3:
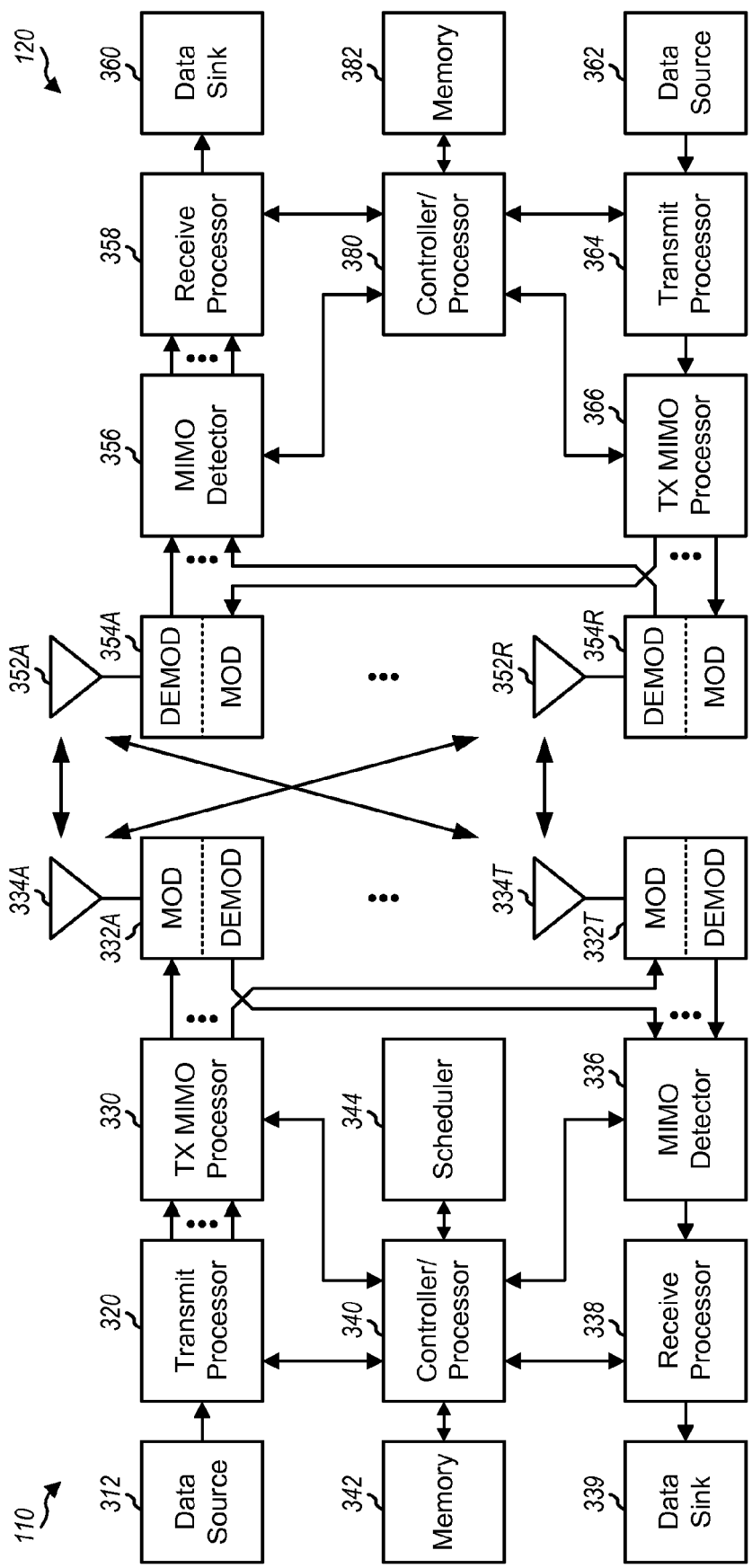
FIG. 3 is a block diagram conceptually illustrating is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may also perform or direct the execution of the functional blocks illustrated in FIGS. 12-17, and/or other processes for the techniques described herein. The processor 380 and/or other processors and modules at the UE 120 may also perform or direct the execution of the functional blocks illustrated in FIG. 19, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

eMBMS and Unicast Signaling in Single Frequency Networks

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as Multimedia Broadcast Single Frequency Network (MBSFN) in the LTE context, can utilize such SFN operation. SFNs utilize radio transmitters, such as, for example, eNBs, to communicate with subscriber UEs. Groups of eNBs can transmit bi-directional information in a synchronized manner, so that signals reinforce one another rather than interfere with each other. Use of eMBMS may provide an efficient way to transmit shared content from an LTE network to multiple mobile entities, such as, for example, UEs.

With respect to a physical layer (PHY) of eMBMS for LTE FDD, the channel structure may comprise time division multiplexing (TDM) resource partitioning between an eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes for eMBMS.

Small Cell eMBMS—Overview

Small cells, as used herein, mean low-power access nodes such as defined in 3GPP T.R. 36.932 section 4. Small cells using low power nodes are considered in 3GPP Release 12, and may include pico cells for which MBMS support is included since 3GPP Release 9. Deployment of eMBMS in small cells may be used to offload unicast traffic from macro cells and improve system capacity. In addition, eMBMS with small cell deployment may be used to mitigate handover events for UEs interested in receiving MBMS service.

The present disclosure proposes certain features related to eMBMS small cell deployment. These features may include causing a UE to assign a higher selection priority to a macro layer or cell, if the UE is interested in an eMBMS service. A UE is interested in receiving a service if it has determined that it should receive, or obtain additional information about receiving, or is about to receive, the service. The core network may indicate macro layer or macro cell information to interested UEs. These features may be useful in dense small cell deployments, wherein one or more small cells are deployed within radio range of the same macro cell.

In addition, the features may include adopting a distinction between the dormant and active states for a small cell, based on whether or not the small cell is transmitting on the Physical Multicast Channel (PMCH). The dormant and active states may be independent of a unicast transmission from the small cell.

The features may further include the small cell determining whether to transmit PMCH based on an indication of received MBSFN signal strength. The indication of signal strength may be obtained by the small cell making MBSFN signal measurements. In the alternative, or in addition, a UE may provide an MBMS indication and measurement report to the small cell. If no interested UE is detected by the small cell or the MBSFN signal strength is sufficient without small cell participation in the MBSFN transmission, the small cell may not initiate an MBSFN transmission.

The features may further include selecting a Multicast Coding Scheme (MCS) in consideration of the dormant or active state(s) of one or more small cells. For example, an MCE or other network entity may use the dormant/active state of a small cell as an input into a process for selecting an MCS for an MBSFN transmission. The network may select the MCS so as to account for one or more small cells turning on an MBSFN transmission. The process for selecting the MCS may use a strategy of aligning MBSFN and unicast transmissions in small cells when possible. For example, MBMS and unicast services for a UE should be provided by a single small cell instead of being provided to a UE (or set of USs) from different adjacent small cells.

Idle UE Behavior for eMBMS Using Small Cells

A UE interested in receiving an eMBMS service at the time of performing a cell reselection may assign a higher priority to a macro layer or cell providing the service, instead of a small cell providing the same service even if the MBSFN signal from the small cell is stronger than from the macro cell. For example, a macro cell may be assigned a higher priority than any candidate small cells, as long as the UE is interested in an eMBMS service that can be received from the macro cell. This approach may avoid frequent switching of the cell camped on and the corresponding overhead activities associated with cell switching such as reading of system information and paging.

To implement the prioritization of macro cells during cell reselection, the UE may need to be aware of macro layer or cell identifiers (ID). A current MBMS user service description (USD) for example as used in a BM-SC may be used to indicate an MBMS frequency layer. For example, in one implementation the USD may identify one or more macro frequency layers while excluding small cell frequency layers. In the alternative, or in addition, a neighbor macro cell ID may be added in a System Information Block (SIB) provided to the UE to indicate a macro cell supporting the MBMS service.

MBMS-based prioritization may interact with UE behavior in high mobility situations (e.g., a rapidly moving mobile UE in a vehicle or the like). Such prioritization in cell selection may be independent of UE velocity, or may depend partly on UE velocity, depending on the implementation.

Connected UE Behavior for eMBMS with Small Cells

UEs interested in eMBMS may be handed over to a macro layer or cell to mitigate frequent handover caused by crossing numerous small cell boundaries in a dense small cell deployment. For example, an "MBMSInterestIndication" may be used by the UE to indicate MBMS interest. Frequency layer(s) with service of UE interest, and priority between unicast and eMBMS may be included in an MBMSInterestIndication. By receiving an MBMSInterestIndication signal from the UE, the eNB can determine whether the UE is interested in eMBMS, and can use this information for handover.

eMBMS Small Cell Behavior Based on MBSFN Measurements

Small cells, when in a Dormant or Active state, may perform MBSFN signal measurements periodically. The small cells may measure, for example, the MBSFN Reference Signal Received Power (RSRP), the Reference Signal Received Quality (RSRQ) or the Signal-to-Noise Ratio (SNR) to measure any received MBSFN signal, including signals from macro cells or neighboring small cells. The small cell may include some UE functionality (e.g., position measurement, signal measurement), and use this functionality to perform such measurements periodically. At the same time, like a macro cell and unlike a UE, the small cell may receive the Multicast Control Channel (MCCH) from the Multicast Coordinating Entity (MCE) or an eNB via a backhaul communication.

Based on a current measurement value of the MBSFN signal, the small cell may take a predetermined action. For example, when the measurement value indicates that MBSFN signal quality is not sufficient for PMCH decoding, dormant small cells may broadcast PMCH signals. The PMCH signals may include both MBSFN RS and data. In addition, the small cell may determine (e.g., set) the actual PMCH transmit power depending on the measured MBSFN signal strength. For further example, dormant small cells may ramp up MBSFN transmission power depending on number of contiguous MBSFN subframes to minimize implementation impact on UEs.

In addition, small cells may use signal strength measurements to control other aspects of MBMS management. For example, depending on MBSFN signal strength, active small cells may mute or use reduced power to transmit PMCH symbols, as compared to unicast or small cell full transmit power. A degree of power reduction may be based on a PMCH quality requirement. For example, an active small cell may reduce transmit power in steps until a signal threshold (e.g., MBSFN RSRP, RSRQ, or SNR) based on the current MCS is approached or reached. In turn, a PMCH quality requirement may be based on the highest MCS listed in MCCH for an eMBMS service, or based on the highest MCS in use by a UE serviced by the small cell. It should be appreciated that the transmission or muting of PMCH signals will not cause additional handover events to occur in present wireless 3GPP networks, because the MBSFN signals do not interfere with unicast signals. Any impact on UE implementation due to power variation on PMCH signals may be alleviated with non-causal (end-of-subframe) Automatic Gain Control (AGC) or eMBMS-specific AGC.

eMBMS Small Cell Behavior Based on UE Reports

MBSFN measurements by the small cell may not be accurate enough to represent all UEs within coverage of the small cell, because of differences in position between the small cell and the UEs. The signal strength experienced by a UE in coverage be different from the signal strength seen by the small cell providing the coverage. In addition, some small cell implementations may not support signal measurements at the small cell. Generally, the small cell is not aware of whether or not a UE in the small cell's coverage is interested in receiving an eMBMS service.

In an aspect, transmission of a PMCH signal may be based on UE reports. Such UE reports may indicate a UE's MBMS interest and a received MBSFN signal strength as measured by the UE. It should be appreciated that a MBMS interest indication may be provided by RRC Connected UEs using existing techniques. However, MBSFN signal measurement reporting by the UE to small cells is not provided for in current standards. Therefore, it may be desirable to add provisions for supporting MBSFN signal measurement and reporting by the UE. Measurement reports may be provided to the small cell in a MBMS Interest Indication message or in a separate measurement report or bundled together in a unicast measurement report.

For an idle UE being serviced by a small cell, reporting of MBMS interest to the small cell may be handled by having the UE transition to a connected state, and following the procedures outlined above for a connected UE. This approach should not cause unacceptable increases in overhead because the unicast capacity of small cells should not be an issue. Advantageously, this approach does not require changes to be made to wireless standards other than those outlined above for measurement reporting.

In an alternative, instead of the idle UE transitioning to a connected state, the idle UE may use special Physical Random Access Channel (PRACH) signaling. The MBSFN measurement value sent via PRACH signaling may be handled similarly to how the Channel Quality Indication (CQI) indication is handled by the UE when sending a PRACH signal. For example, if the MBSFN measurement value is equal to or above a certain threshold the UE may send a first PRACH sequence to signal that the MBSFN measurement value is high and if the MBSFN measurement value is below the threshold the UE may send a second PRACH sequence to signal that the MBSFN measurement value is low. More MBSFN measurement values may be signaled using additional PRACH sequences. Advantageously, a typical small cell does not have to handle a large number of UEs, and therefore the PRACH bandwidth should have capacity to handle the additional signal indication in most circumstances.

In addition, the UE may indicate the MBSFN interest using the PRACH signal similarly to CQI indicating outlined above. Accordingly, the small cell may obtain UE MBMS interest and/or signal strength via a PRACH sequence and determine the PMCH transmission accordingly. In an aspect, the small cell may signal to the UE concerning whether the UE should send MBMS interest and signal strength via PRACH signaling. As noted, the MBSFN signal strength signaling and/or MBMS interest indication via the PRACH may be handled by the UE in a manner similar to CQI indication.

To further reduce UE reporting overhead, reporting frequency may be limited such that the idle UE only reports when signal strength relative to MCS is below a specified threshold. For example, the idle UE may not report signal strength unless a measured signal strength value is less than a threshold specified for a particular MCS value. Different reporting thresholds may be specified for different MCS values. In general, the threshold for reporting signal strength may increase with higher MCS values. The threshold may be signaled by the network (e.g., using a SIB) or set to a predefined value based on UE implementation.

MCS Setting in MBSFN Area

A network MCS setting for a MBSFN may take into account small cells transmitting on the PMCH in a MBSFN area. MCS specified by a network entity may be adjusted responsive to a number of small cells turning on MBSFN transmission in an area. As used herein, a "network entity" excludes access terminals such as UEs or mobile entities.

Small cells may be independently dormant or active, either on unicast or MBSFN signaling. For example, it is possible (but not optimal) for a small cell to be in an active mode for unicast signaling, while being in dormant mode for MBSFN signaling, and vice-versa. Optimal energy saving may be achieved when small cells transmit neither unicast nor MBSFN. When small cells transmit unicast signals, transmission of MBSFN signals does not incur significant additional energy use over the energy use for transmitting the unicast signals. Therefore, it may be advantageous to couple transmission of unicast and MBSFN signals in the same small cell, when feasible.

To this end, including a estimation of a probability of small cells transmitting MBSFN as in input parameter in a network-side determination of MCS in an MBSFN area may enhance system-wide small cell energy efficiency, improve MBSFN coverage and increase MBSFN capacity in the MBSFN area. For example, the MCS may be based on reports of opportunistic small cell transmission to a network entity setting MCS in the area. In addition, a small cell may also report transmission status to a MCE, and the MCE can adjust the MBSFN configuration accordingly, including the MCS. The transmission status of the small cell may include transmission of unicast signaling, transmission of MBSFN signaling, and the respective transmission powers for the foregoing signaling.

In addition, a small cell may report MBSFN signal measurements or UE reported measurements to the MCE in addition to reporting transmission status. In an aspect, an objective for the MCS may be to use a MCS such that the small cell can be either muted or active on both unicast and MBSFN. For example, the MCS may be set at a level that causes a small cell to either be active on both unicast and MBSFN, or dormant on both unicast and MBSFN. UEs within a small cell coverage area may receive an MBSFN signal from other cells in the MBSFN area even without the small cell transmitting the MBSFN signal, if the small cell is dormant on unicast. Conversely, the MCS level takes MBSFN signal transmission from a small cell into account, when the small cell is active on unicast transmission.

In an aspect, small cell transmission of MBSFN signals may generally be aligned with unicast transmissions by the small cell, except when the small cell should be enabled for MBSFN coverage reasons. For example, a small cell may receive a measurement report from a nearby UE. When the report indicates adequate MBSFN reception, the small cell may align MBSFN transmissions with unicast transmissions (for example, setting both MBSFN and unicast transmissions on, or both off), in response to the report. When the report indicates inadequate MBSFN reception, the small cell may enable MBSFN transmission even when not transmitting unicast signals, to improve MBSFN coverage.

Figure 4:
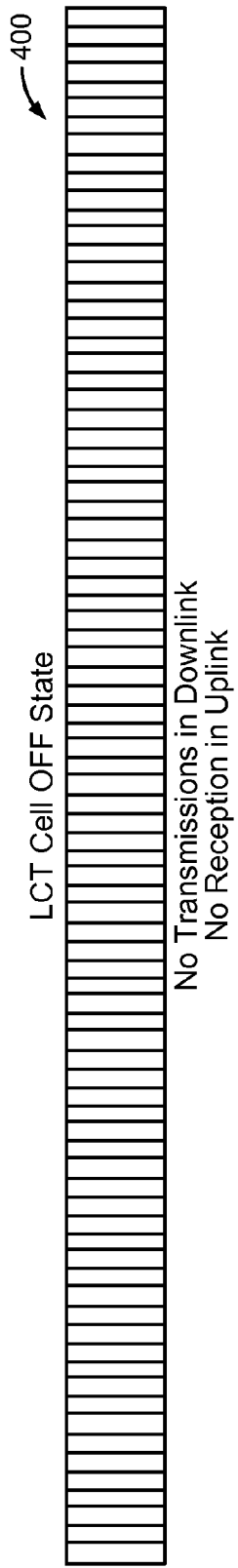
FIGS. 4-6 illustrate downlink frames in respective off, dormant and active states of a legacy carrier type (LCT) small cell.
Figure 5:
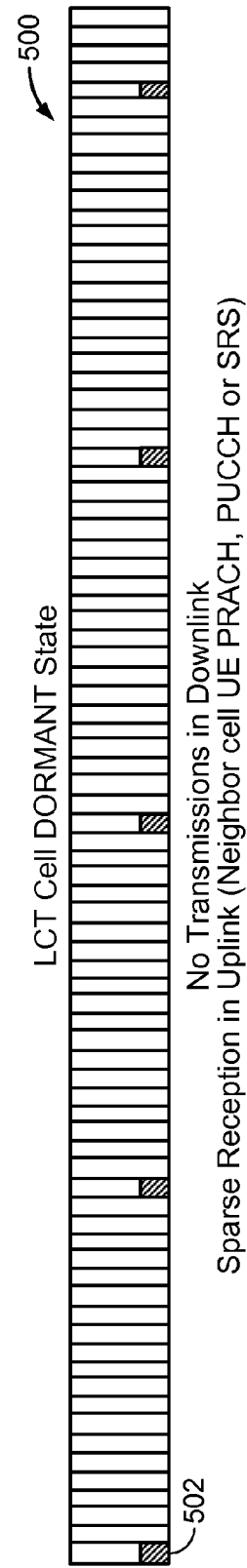

FIGS. 4-6 illustrate downlink frames in respective off, dormant and active states of a legacy carrier type (LCT) small cell. A LCT small cell may transmit PSS/SSS, PBCH and SIB information to allow a UE to camp on the small cell. In the LCT off state 400, there are no transmissions on the downlink and no reception on the uplink, as shown in FIG. 4. In the LCT dormant state 500, there are no transmissions on the downlink, and sparse reception 502 on the uplink, for example reception of PRACH, Physical Uplink Control Channel (PUCCH) or Sounding Reference Signal (SRS) from a neighbor cell, as shown in FIG. 5. The dormant LCT cell may transmit PMCH signals. In the LCT active state 600, there are common signals on the downlink and certain control and/or data signals on the uplink. For example, the active LCT small cell may transmit Primary Synchronization Signals (PSS) and Secondary Synchronization Signals (SSS) signals in every fifth subframe 602, Physical Broadcast Channel (PBCH) in every tenth subframe 604 and SIB 1 in every twentieth subframe 606 on the downlink, as shown in FIG. 6. The active LCT cell may mute PMCH signals.

In comparison, FIGS. 7-9 illustrate downlink frames in respective off, dormant and active states of an enhanced new carrier type (eNCT) small cell. In the eNCT off state 700, there are no transmissions on the downlink and no reception on the uplink, as shown in FIG. 7. In the eNCT dormant state 800, there are low duty sparse signals 802 on the downlink, and uplink reception 804, for example reception of PRACH from all connected UEs and 3GPP Release 12 compliant idle UEs, as shown in FIG. 8. Downlink signals may also include PSS, SSS, PBCH, narrowband RS and SIB 0 in every $200^{th}$ subframe (not shown). The dormant eNCT cell may transmit PMCH signals. In the eNCT active state 900, the small cell may transmit high duty cycle sparse signals on the downlink and receive certain control and/or data signals on the uplink. For example, the active eNCT small cell may transmit PSS, SSS signals and Wideband RS in every fifth subframe 902, PBCH in every tenth subframe 904 and SIB 1 in every twentieth subframe 906 on the downlink, as shown in FIG. 9. The active eNCT cell may mute PMCH signals.

Consideration of MBMS Support in Open Access HeNB

Figure 10:
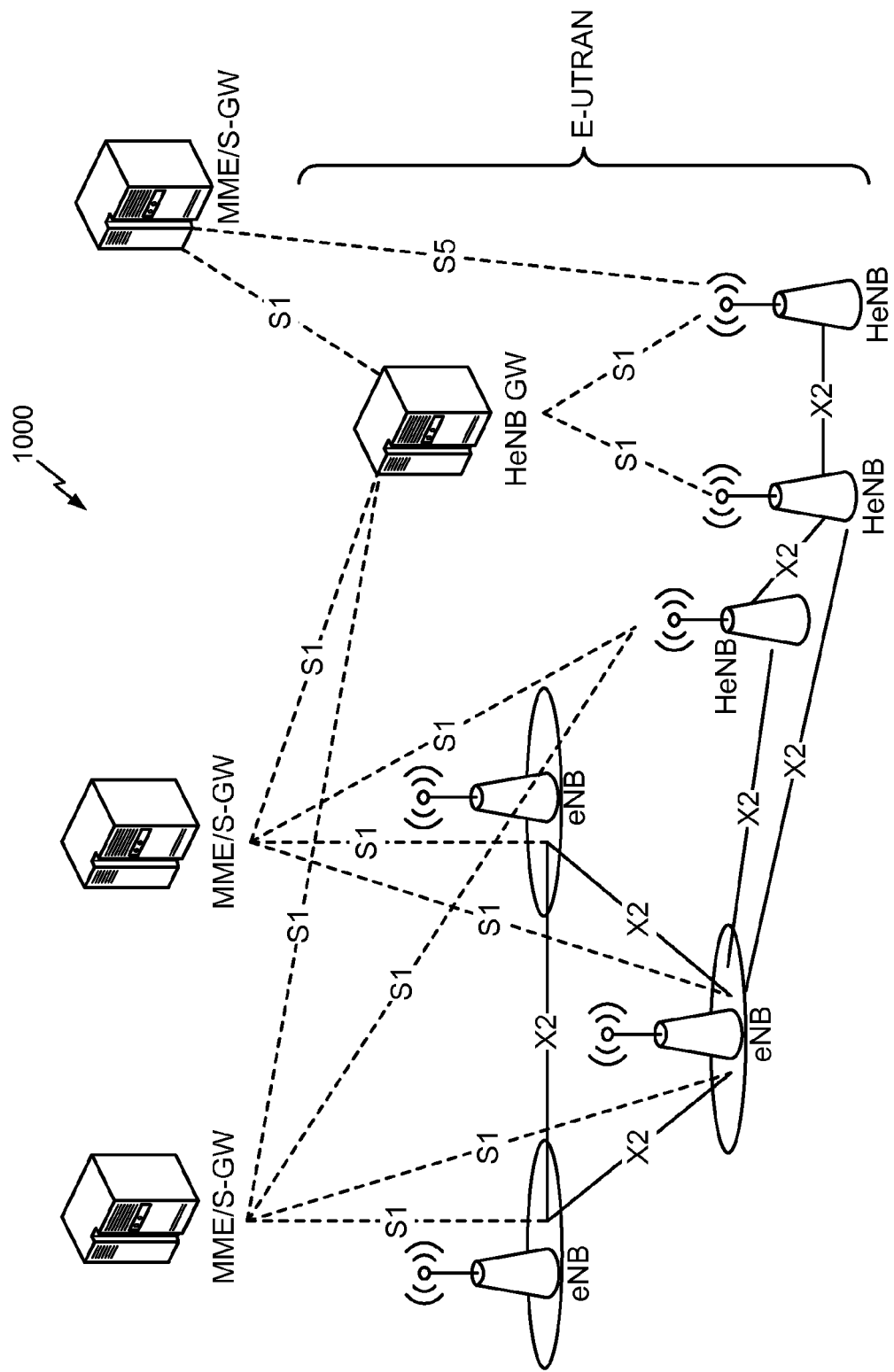
FIG. 10 illustrates a current overall architecture with deployed small cells in 3GPP.
Figure 11:
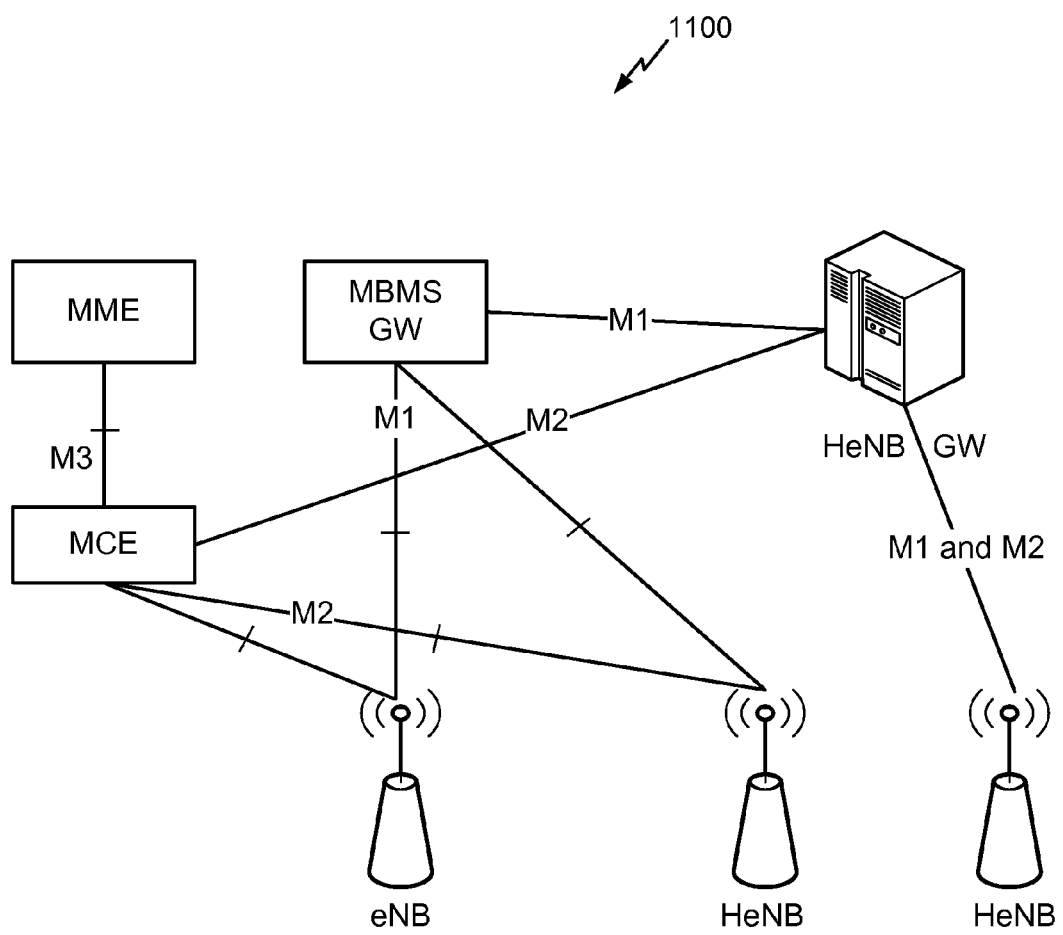
FIG. 11 illustrates an eMBMS logical architecture with small cells.

MBMS typically is not supported by a Home eNB (HeNB). To provide HeNB eMBMS support, a new eMBMS logical architecture may be employed with small cells. FIG. 10 illustrates an architecture 1000 with deployed small cells in 3GPP. The HeNB in the architecture 1000 lacks an M1 or M2 interface to the SGW or HeNB GW. FIG. 11 illustrates another eMBMS logical architecture 1100 with small cells. The architecture 1100 includes an M2 interface to the MBMS GW, and an M1 and M2 interface to the HeNB GW. For example, with introduced synchronization and backhaul communications for the HeNB supported in 3GPP Release 12, it is possible to extend M1 and M2 interface to the HeNB. Therefore M1 and M2 interfaces may be introduced in parallel to conventional M and M2 interfaces used by macro cells, using the synchronization and backhaul communications capabilities supported by the HeNB.

Example Methodologies and Apparatus

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Figure 12:
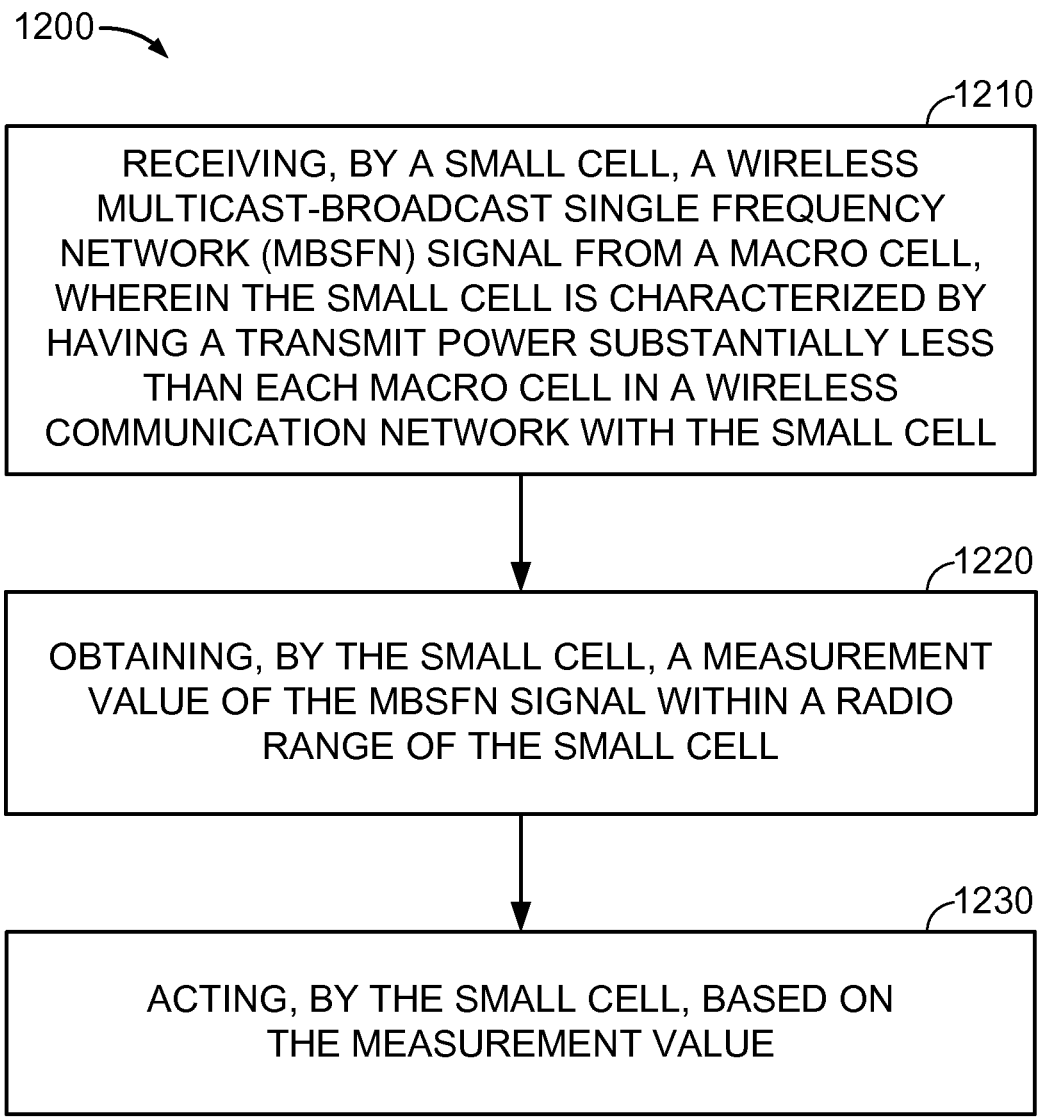
FIGS. 12-17 illustrate embodiments of a methodology for managing eMBMS services performed at a small cell (low-power access node).

FIG. 12 shows a method 1200 by a small cell for wireless communication, including providing evolved Multimedia Broadcast/Multicast Services (eMBMS) services. The small cell may be a low power base station (e.g., femto node, pico node, Home Node B, etc.) of a wireless communications network. The method 1200 may include, at 1210, receiving, by a small cell, a wireless MBSFN signal from a macro cell, wherein the small cell is characterized by having a transmit power substantially less (e.g., less than 10%, or less than 5%, of average macro cell power) than each macro cell in a wireless communication network with the small cell. As an example, the transmit power of a small cell may be 1 W while the macro is using 40 W transmit power. The method 1200 may include, at 1220, obtaining, by the small cell, a measurement value of the MBSFN signal within a radio range of the small cell. More detailed aspects of obtaining the measurement values are discussed below in connection with FIGS. 13-14. The method 1200 may include, at 1230, the small cell acting based on the measurement value. For example, the small cell may select one of plural actions to take depending on the obtained measurement value. Further examples and more detailed aspects of contingent operations based on the measurement values are discussed below in connection with FIGS. 13-17.

FIGS. 13-17 show further optional operations or aspects 1300, 1400, 1500, 1600 and 1700 that may be performed by the small cell in conjunction with the method 1200. The operations shown in FIGS. 13-17 are not required to perform the method 1200. Operations 1300, 1400, 1500, 1600 and 1700 are independently performed and not mutually exclusive. Therefore any one of such operations may be performed regardless of whether another downstream or upstream operation is performed. If the method 1200 includes at least one operation of FIGS. 13-17, then the method 1200 may terminate after the at least one operation, without necessarily having to include any subsequent downstream operation(s) that may be illustrated.

Figure 13:
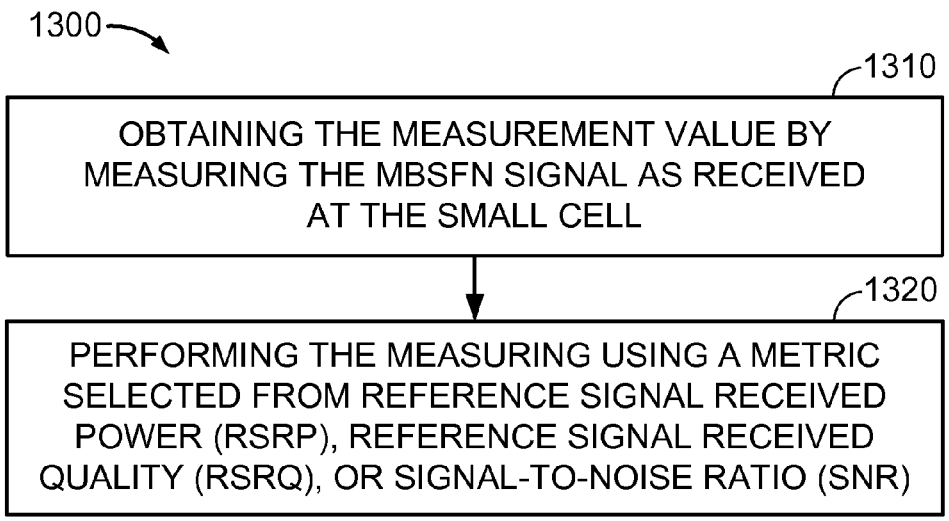

Referring to FIG. 13, the method 1200 may further include, at 1310, obtaining the measurement value by measuring the MBSFN signal as received at the small cell. For example, the method 1200 may include, at 1320, performing the measuring using a metric selected from Reference Signal Received Power (RSRP), Reference Signal Received Quality (RSRQ), or Signal-to-Noise Ratio (SNR), based on a MBSFN reference or other signal. It should be appreciated that the operations 1310 and 1320 may be performed in any operative order. For example, a small cell may first select a metric 1320 and then measure the MBSFN signal 1310 as received at the small cell to obtain the corresponding measurement value for the metric. In addition, either or both of the operations 1300 may be performed in any operative order in conjunction with the operations of method 1200. For example, selecting one of the recited metrics 1320 may be performed in conjunction with the operation 1220 of obtaining a measurement value within radio range, with or without measuring the MBSFN signal as received at the small cell 1310.

Figure 14:
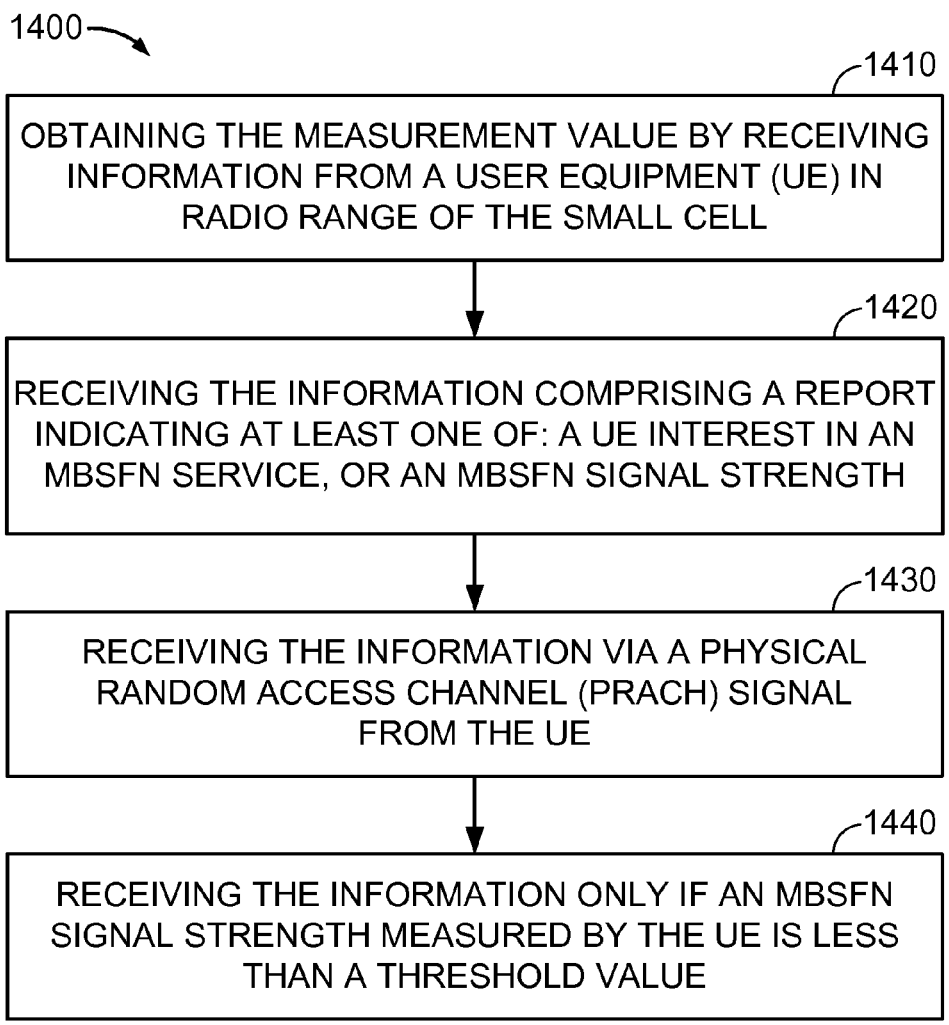

Referring to FIG. 14, the method 1200 may further include, at 1410, obtaining the measurement value by the small cell receiving information from a user equipment (UE) in radio range of the small cell. For example, the method 1200 may include, at 1420, receiving the information comprising a report indicating at least one of: a UE interest in an MBSFN service, or an MBSFN signal strength. MBSFN signal strength may be indicated in the report using a metric such as, for example, RSRP, RSRQ or SNR. In an aspect, the method 1200 may include, at 1430, receiving the information via a Physical Random Access Channel (PRACH) signal from the UE, where the UE signals the value by selecting a PRACH sequence based on the MBSFN signal strength. In another aspect, the method 1200 may include, at 1440, receiving the information only if an MBSFN signal strength measured by the UE is less than a threshold value. Conversely, if the MBSFN signal strength measured by the UE is above the threshold, the small cell may not receive such information or attempt to initiate any MBSFN service.

Figure 15:
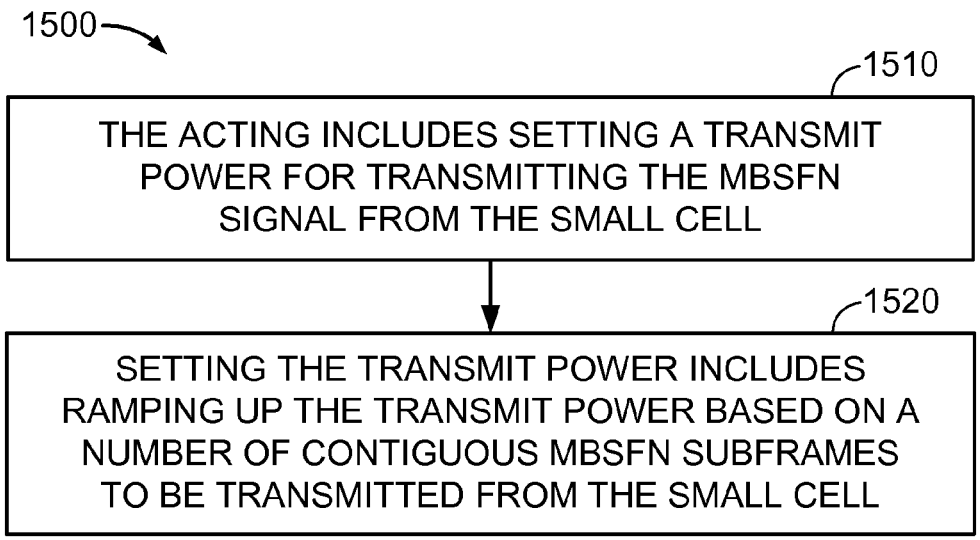

The method 1200 may further include the operations 1500 as shown in FIG. 15 regarding the action taken by the small cell based on the measurement value. Specifically, the acting operation 1230 of method 1200 may further include, at 1510, setting a transmit power for transmitting the MBSFN signal from the small cell. For example, setting the transmit power 1510 may include, at 1520, ramping up the transmit power based on a number of contiguous MBSFN subframes to be transmitted from the small cell. The greater the number of contiguous frames, the less rapidly the small cell may ramp up the transmit power when initiating the MBSFN service. A smaller change on small cell transmit power between adjacent subframes may not incur as much impact on UE implementation and may reduce implementation complexity.

Figure 16:
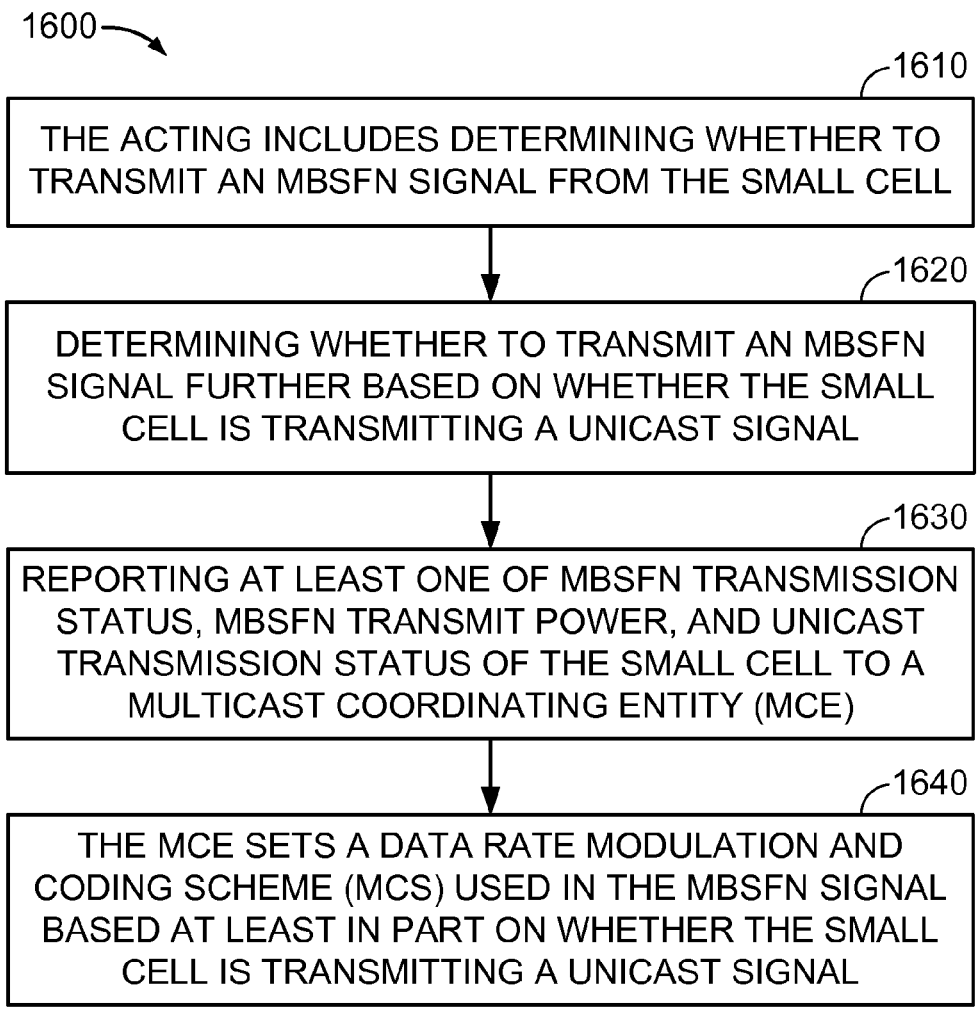

In the alternative, or in addition, the method 1200 may further include the operations 1600 as shown in FIG. 16 regarding the action taken by the small cell based on the measurement value. Specifically, the acting operation 1230 of method 1200 may further include, at 1610, determining whether to transmit an MBSFN signal from the small cell based on the measurement value. For example, if the measurement value exceeds a defined threshold, the small cell may determine that it will not transmit an MBSFN signal. Conversely, if the measurement value is below a defined threshold, the small cell may determine that it will transmit an MBSFN signal. In another aspect of the method 1200, at 1630, determining whether to transmit an MBSFN signal may be further based on whether the small cell is transmitting a unicast signal. The method 1200 may include, at 1630, reporting at least one of MBSFN transmission status, MBSFN transmit power, and unicast transmission status of the small cell to a Multicast Coordinating Entity (MCE). At 1640, the MCE may set a data rate Modulation and Coding Scheme (MCS) used in the MBSFN signal based at least in part on whether the small cell is transmitting a unicast signal. As noted above, small cell transmission of MBSFN signals may generally be aligned with unicast transmissions by the small cell, except when the small cell should be enabled for MBSFN coverage reasons.

Figure 17:
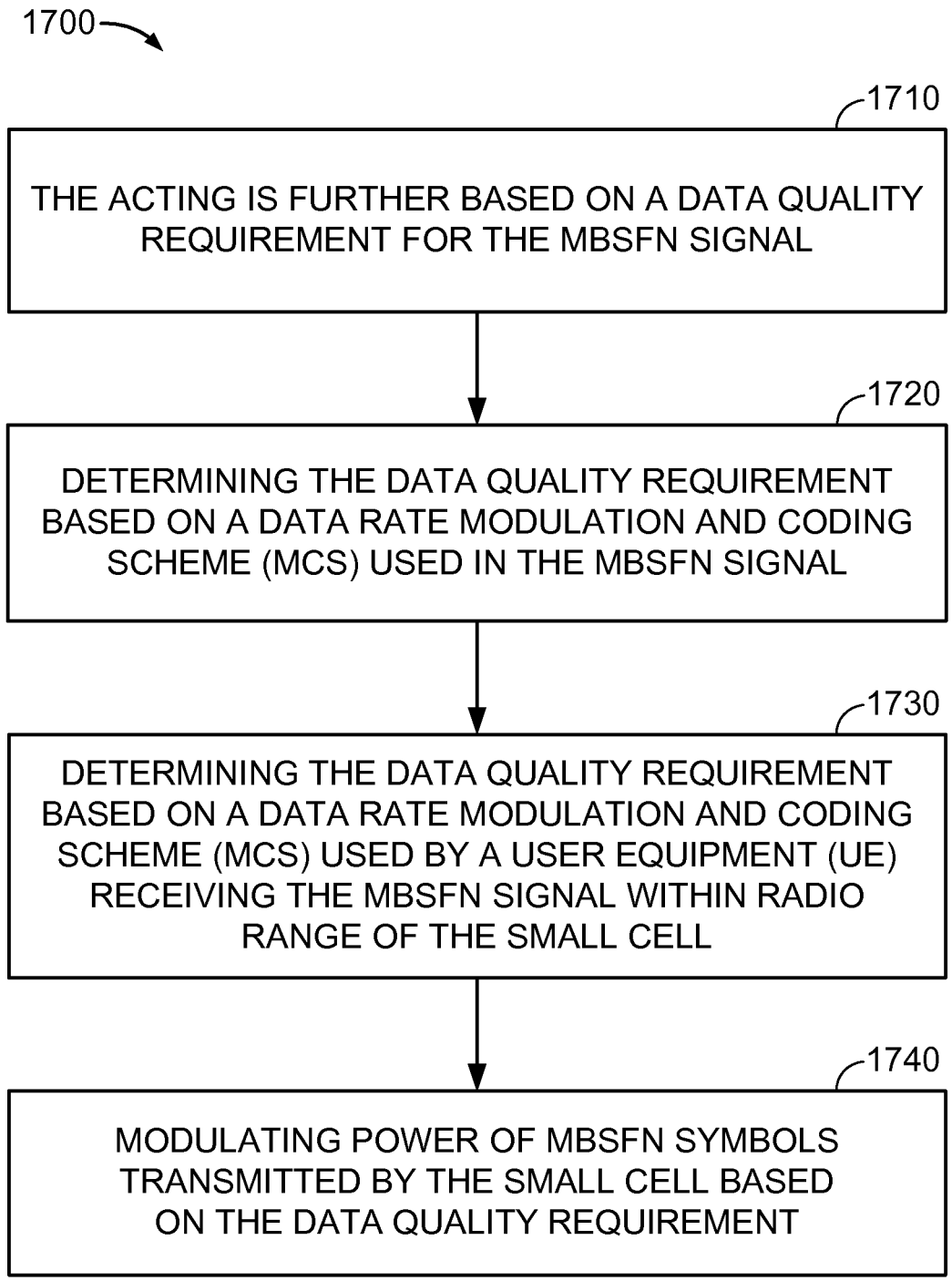

In another aspect, the method 1200 may include the additional operations 1700 shown in FIG. 17. The acting operation 1230 may be further based, at 1710, on a data quality requirement for the MBSFN signal. For example, at 1720, the small cell may determine the data quality requirement based on a data rate MCS used in the MBSFN signal. In the alternative, at 1730, the small cell may determine the data quality requirement based on an MCS used by a UE receiving the MBSFN signal within radio range of the small cell. For example, the High Speed Downlink Packet Access (HSDPA) system in 3GPP defines about 30 different multicast coding schemes (MCSs) from which a MCS can be selected based on a channel quality indicator (CQI) report from a receiver. Similarly, in LTE, the eNB (e.g., small cell) may select an MCS from multiple alternatives based on the CQI and optionally other factors. Thus, a correlation exists between the selected MCS, CQI, and maximum data rate, such as defined by HSDPA, LTE or analogous system. The method 1200 may include, at 1740, modulating power of MBSFN symbols transmitted by the small cell based on the data quality requirement.

Figure 18:
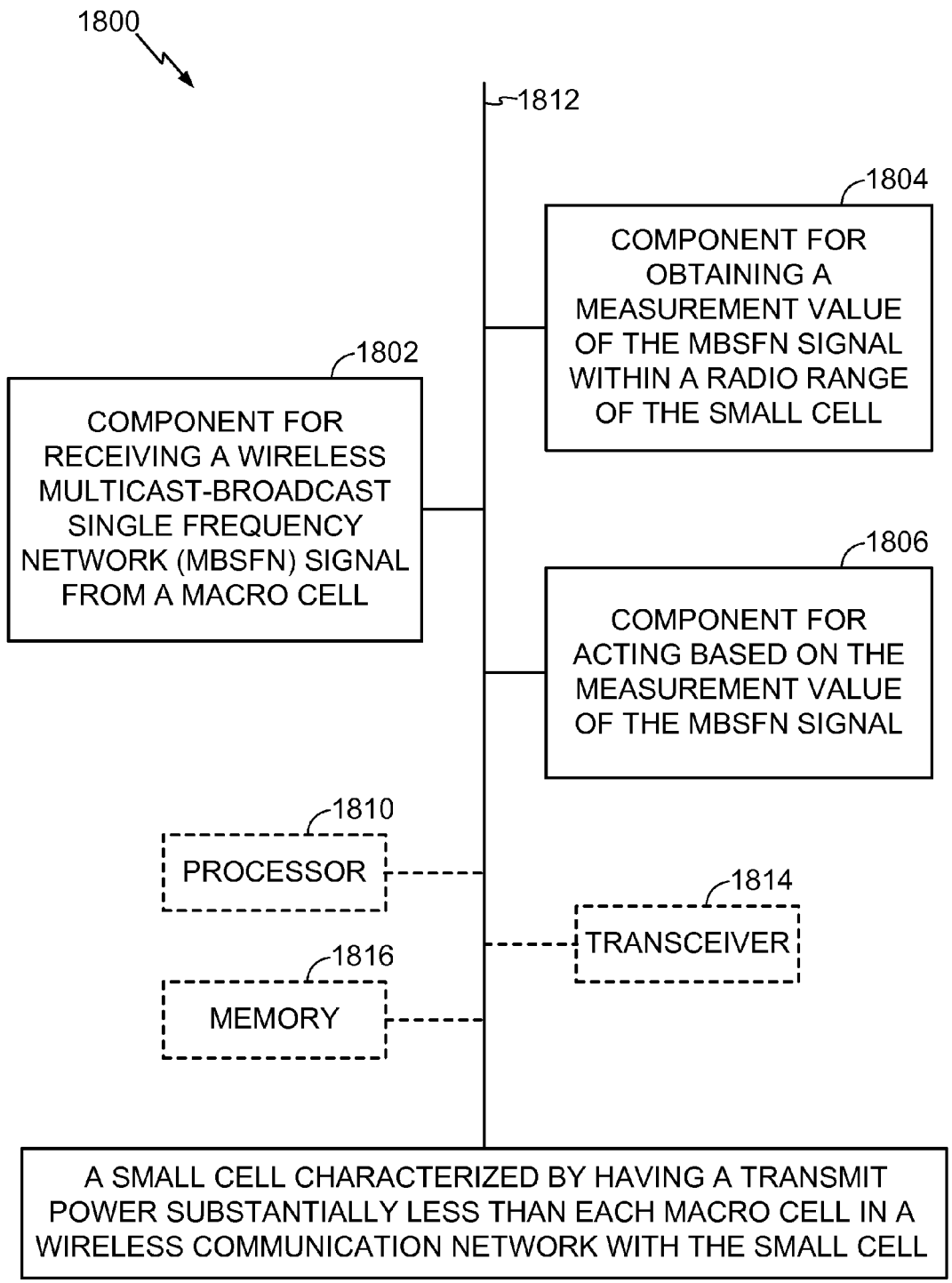
FIG. 18 illustrates an embodiment of a small cell apparatus for managing eMBMS services, in accordance with the methodologies of FIGS. 12-17.

With reference to FIG. 18, there is provided an exemplary apparatus 1800 that may be configured as a small cell in a wireless network, or as a processor or similar device for use within the small cell, for providing eMBMS. The small cell 1800 may be characterized by having a transmit power substantially less than each macro cell in a wireless communication network with the small cell. The apparatus 1800 may include functional blocks that can represent functions implemented by a processor, software, hardware, or combination thereof (e.g., firmware).

As illustrated, in one embodiment, the apparatus 1800 may include an electrical component or module 1802 for receiving an MBSFN signal from a macro cell of the wireless communication network. For example, the electrical component 1802 may include at least one control processor coupled to a transceiver or the like and to a memory with instructions for receiving the MBSFN signals on one or more wireless carriers. The component 1802 may be, or may include, a means for receiving an MBSFN signal from a macro cell of the wireless communication network. Said means may include the control processor executing an algorithm for receiving a wireless MBSFN signal according to a more detailed protocol as referenced herein above, for example, 3GPP or 3GPP2. This may include, for example, receiving a control channel specifying radio resources and a coding scheme for the MBSFN signal, receiving signals on the radio resources indicated by the control channel, and decoding the signals according to the indicated coding scheme.

The apparatus 1800 may include an electrical component 1804 for obtaining a measurement value of the MBSFN signal within a radio range of the small cell. For example, the electrical component 1804 may include at least one control processor coupled to a transceiver or the like and to a memory holding instructions for obtaining the measurement value. The component 1804 may be, or may include, a means for obtaining a measurement value of an MBSFN signal. Said means may include the control processor executing an algorithm for directly measuring a received signal (e.g., using a measurement metric as referenced herein above) or receiving a measurement report from a UE.

The apparatus 1800 may include an electrical component 1806 for taking a predefined action based on the measurement value obtained by the component 1804. For example, the electrical component 1806 may include at least one control processor coupled to a transceiver or the like and to a memory holding instructions for taking a defined action conditioned on the measurement value. The component 1806 may be, or may include, a means for taking a predefined action conditioned on the measurement value of the MBSFN signal. Said means may include the control processor executing an algorithm for taking a conditional action based on a numeric value, for example conditional IF-THEN branching logic or equivalent operations. The predefined action may be one of the actions described herein above, for example, determining to initiate a MBSFN transmission from the small cell or setting a transmit power for the transmission.

The apparatus 1800 may include similar electrical components for performing any or all of the additional operations 1300-1700 described in connection with FIGS. 13-17, which for illustrative simplicity are not shown in FIG. 18.

In related aspects, the apparatus 1800 may optionally include a processor component 1810 having at least one processor, in the case of the apparatus 1800 configured as a network entity. The processor 1810, in such case, may be in operative communication with the components 1802-1806 or similar components via a bus 1812 or similar communication coupling. The processor 1810 may effect initiation and scheduling of the processes or functions performed by electrical components 1802-1806. The processor 1810 may encompass the components 1802-1806, in whole or in part. In the alternative, the processor 1810 may be separate from the components 1802-1806, which may include one or more separate processors.

In further related aspects, the apparatus 1800 may include a radio transceiver component 1814. A stand alone receiver and/or stand alone transmitter may be used in lieu of or in conjunction with the transceiver 1814. In the alternative, or in addition, the apparatus 2700 may include multiple transceivers or transmitter/receiver pairs, which may be used to transmit and receive on different carriers. The apparatus 1800 may optionally include a component for storing information, such as, for example, a memory device/component 1816. The computer readable medium or the memory component 1816 may be operatively coupled to the other components of the apparatus 1800 via the bus 1812 or the like. The memory component 1816 may be adapted to store computer readable instructions and data for performing the activity of the components 1802-1806, and subcomponents thereof, or the processor 1810, the additional aspects 1300-1700, or the methods disclosed herein. The memory component 1816 may retain instructions for executing functions associated with the components 1802-1806. While shown as being external to the memory 1816, it is to be understood that the components 1802-1806 can exist within the memory 1816.

Figure 19:
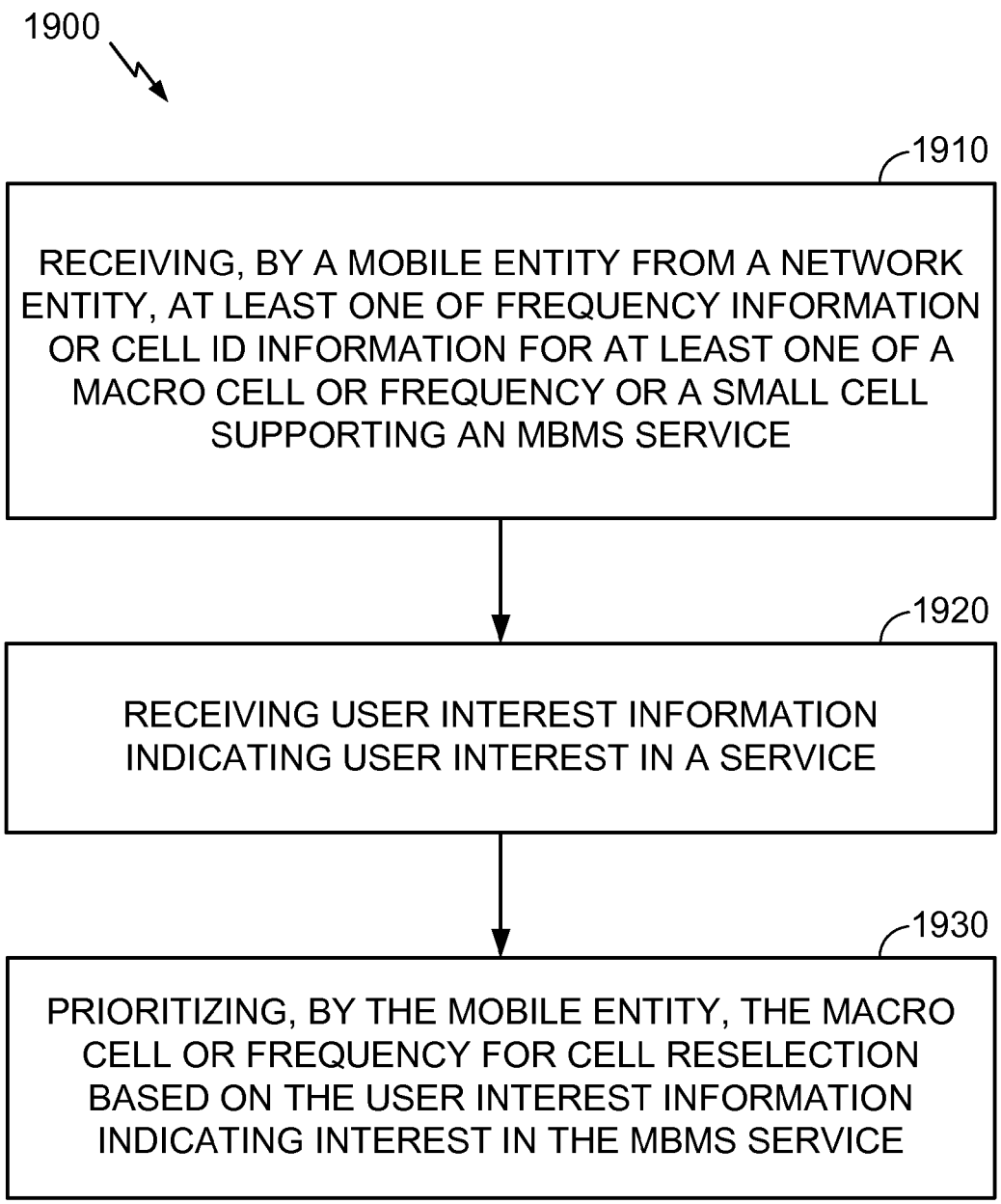
FIG. 19 illustrates an embodiment of a methodology for cell reselection, performed at a mobile entity.

In other aspects, a mobile entity (e.g., a UE) of a wireless communication network may perform a method 1900 for cell reselection, as shown in FIG. 19. The method 1900 may include, at 1910, receiving, by a mobile entity from a network entity, at least one of frequency information or cell ID information, for at least one of a macro cell, macro cell frequency or a small cell supporting an MBMS service. The method 1900 may further include, at 1920, the mobile entity receiving user interest information indicating user interest in a service, for example via touchscreen input. The mobile entity may select or otherwise determine an MBMS service of interest, based at least in part on the user interest information. In an aspect, the information from the network includes the frequency or cell ID information for a small cell supporting the MBMS service of interest indicated by mobile entity. The method 1900 may further include, at 1930, prioritizing, by the mobile entity, the macro cell or frequency for cell reselection based on the user interest information indicating interest in the MBMS service. In an aspect of the method 1900, the mobile entity may be and may remain in idle mode while performing the operations 1910-1930.

Figure 20:
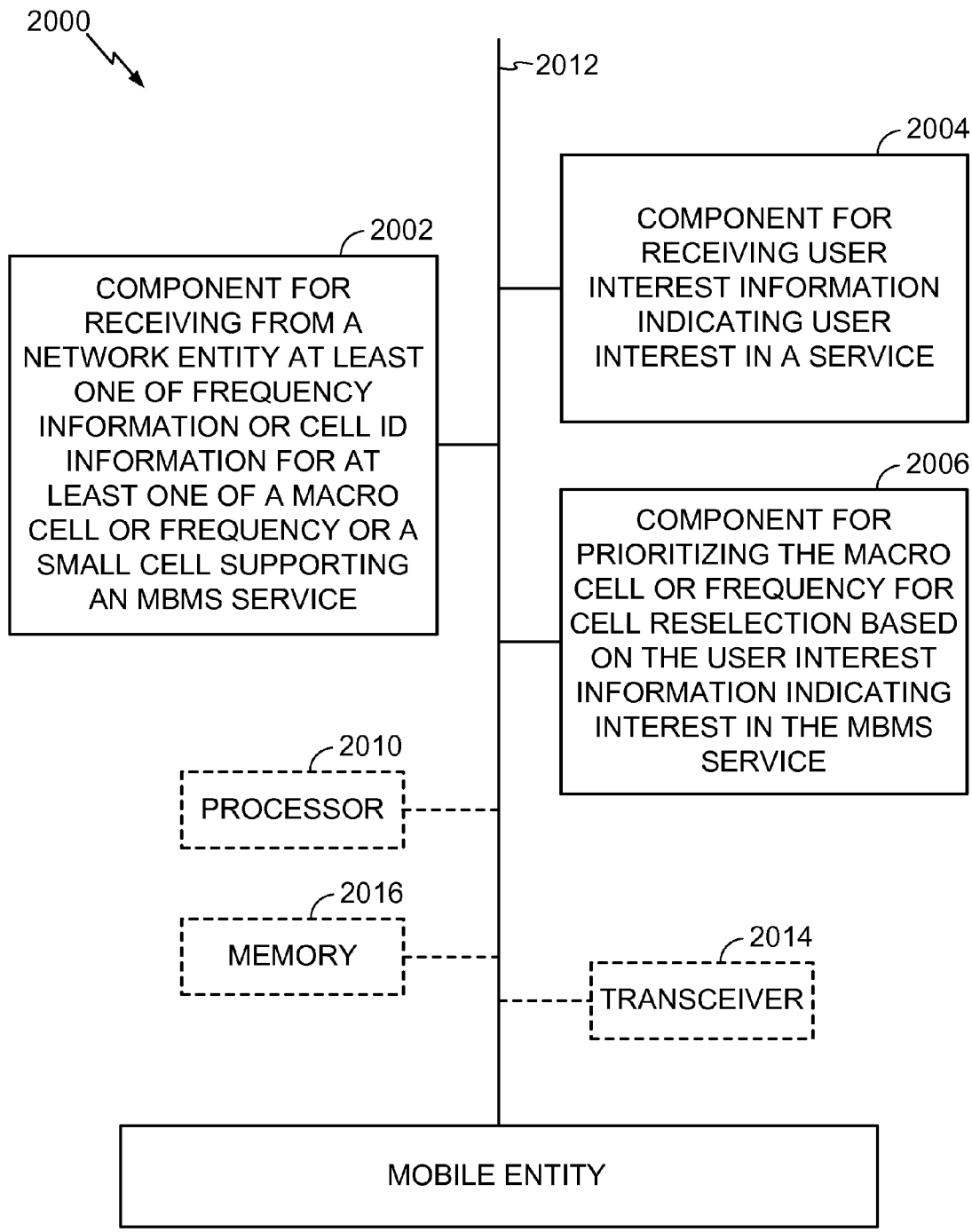
FIG. 20 illustrates an embodiment of an apparatus for cell reselection, in accordance with the methodology of FIG. 19.

With reference to FIG. 20, there is provided an exemplary apparatus 2000 that may be configured as a mobile entity in a wireless network, or as a processor or similar device for use within the mobile entity, for receiving eMBMS service and performing cell reselection in a heterogeneous network characterized by including both macro cells and small cells. The apparatus 2000 may include functional blocks that can represent functions implemented by a processor, software, or combination thereof (e.g., firmware).

As illustrated, in one embodiment, the apparatus 2000 may include an electrical component or module 2002 for receiving from a network entity at least one of frequency information or cell ID information for at least one of a macro cell, macro frequency or a small cell supporting an MBMS service. For example, the electrical component 2002 may include at least one control processor coupled to a transceiver or the like and to a memory with instructions for receiving the information on a control channel of one or more wireless carriers. The component 2002 may be, or may include, a means for receiving from a network entity at least one of frequency information or cell ID information for at least one of a macro cell, macro frequency or a small cell supporting an MBMS service. Said means may include the control processor executing an algorithm for receiving a control signal according a more detailed protocol as referenced herein above.

The apparatus 2000 may include an electrical component 2004 for receiving user interest information indicating user interest in a service. For example, the electrical component 2004 may include at least one control processor coupled to a transceiver or the like and to a memory holding instructions for receiving user interest information via input from a user interface device. The component 2004 may be, or may include, a means for receiving user interest information indicating user interest in a service. Said means may include the control processor executing an algorithm for detecting one or more MBMS services, presenting information identifying the one or more MBMS services in a graphical user interface device, receiving selection data in response to the presenting via a user input device, and associating the selection data with a request for at least one MBMS service.

The apparatus 2000 may include an electrical component 2006 for prioritizing the macro cell or frequency for cell reselection based on the user interest information indicating interest in the MBMS service. For example, the electrical component 2006 may include at least one control processor coupled to a transceiver or the like and to a memory holding instructions for identifying a highest priority entry in a list of prospective target cells for a hand over operation. The component 2006 may be, or may include, a means for prioritizing the macro cell or frequency for cell reselection based on the user interest information indicating interest in the MBMS service. Said means may include the control processor executing an algorithm for defining a list of two or more candidate target cells for a handover operation, identifying any target cells on the list that are macro cells providing the at least one MBMS service of interest, and assigning a higher priority to said macro cells than to small cells providing the same service.

In related aspects, the apparatus 2000 may optionally include a processor component 2010 having at least one processor, in the case of the apparatus 2000 configured as a mobile entity. The processor 2010, in such case, may be in operative communication with the components 2002-2006 or similar components via a bus 2012 or similar communication coupling. The processor 2010 may effect initiation and scheduling of the processes or functions performed by electrical components 2002-2006. The processor 2010 may encompass the components 2002-2006, in whole or in part. In the alternative, the processor 2010 may be separate from the components 2002-2006, which may include one or more separate processors.

In further related aspects, the apparatus 2000 may include a radio transceiver component 2014. A stand alone receiver and/or stand alone transmitter may be used in lieu of or in conjunction with the transceiver 2014. In the alternative, or in addition, the apparatus 2700 may include multiple transceivers or transmitter/receiver pairs, which may be used to transmit and receive on different carriers. The apparatus 2000 may optionally include a component for storing information, such as, for example, a memory device/component 2016. The computer readable medium or the memory component 2016 may be operatively coupled to the other components of the apparatus 2000 via the bus 2012 or the like. The memory component 2016 may be adapted to store computer readable instructions and data for performing the activity of the components 2002-2006, and subcomponents thereof, or the processor 2010, or the methods disclosed herein. The memory component 2016 may retain instructions for executing functions associated with the components 2002-2006. While shown as being external to the memory 2016, it is to be understood that the components 2002-2006 can exist within the memory 2016.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually encode data magnetically, while "discs" customarily refer to media encodedoptically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure.

Thus, the disclosure is not intended to be limited to the examples and designs described herein but is to be accorded the widest scope consistent with the principles and features disclosed herein.

What is claimed is:

1. A method of wireless communication, comprising:
   receiving, by a small cell, a wireless Multicast-Broadcast Single Frequency Network (MBSFN) signal from a macro cell, wherein the small cell is characterized by having a transmit power substantially less than each macro cell in a wireless communication network with the small cell, wherein the small cell is not transmitting on a Physical Multicast Channel (PMCH);
   obtaining, by the small cell, a signal strength of the MBSFN signal within a radio range of the small cell;
   determining, by the small cell, that the signal strength of the MBSFN signal does not meet or exceed a threshold signal strength value sufficient for PMCH decoding; and
   transmitting, by the small cell, the MBSFN signal on the PMCH based on the determination.

2. The method of claim 1, wherein the obtaining is performed by measuring a metric of the MBSFN signal as received at the small cell, wherein the metric is selected from Reference Signal Received Power (RSRP), Reference Signal Received Quality (RSRQ), or Signal-to-Noise Ratio (SNR).

3. The method of claim 1, wherein the obtaining is performed by receiving information from a user equipment (UE) in radio range of the small cell.

4. The method of claim 3, wherein the information comprises a report indicating at least one of: a UE interest in an MBSFN service, or an MBSFN signal strength.

5. The method of claim 3, wherein the information is received via a Physical Random Access Channel (PRACH) signal from the UE.

6. The method of claim 3, wherein the UE provides the information only if an MBSFN signal strength measured by the UE is less than a threshold value.

7. The method of claim 1, further comprising setting a transmit power for transmitting the MBSFN signal from the small cell.

8. The method of claim 7, wherein setting the transmit power further comprises ramping up the transmit power based on a number of contiguous MBSFN subframes to be transmitted from the small cell.

9. The method of claim 1, further comprising determining a data quality requirement based at least one of: a data rate Modulation and Coding Scheme (MCS) of the MBSFN signal, or a data rate MCS used by a user equipment (UE) receiving the MBSFN signal within radio range of the small cell.

10. The method of claim 1, further comprising modulating power of MBSFN symbols transmitted by the small cell based on a data quality requirement.

11. The method of claim 1, further comprising reporting at least one of MBSFN transmission status, MBSFN transmit power, and unicast transmission status of the small cell to a Multicast Coordinating Entity (MCE).

12. The method of claim 11, wherein the MCE determines a data rate Modulation and Coding Scheme (MCS) for the MBSFN signal based at least in part on whether the small cell is transmitting a unicast signal.

13. An apparatus for wireless communication, the apparatus comprising:
    means for receiving, at a small cell, a wireless Multicast-Broadcast Single Frequency Network (MBSFN) signal from a macro cell, wherein the small cell is characterized by having a transmit power substantially less than each macro cell in a wireless communication network with the small cell, wherein the small cell is not transmitting on a Physical Multicast Channel (PMCH);
    means for obtaining, by the small cell, a signal strength of the MBSFN signal within a radio range of the small cell;
    means for determining, by the small cell, that the signal strength of the MBSFN signal does not meet or exceed a threshold signal strength value sufficient for PMCH decoding; and
    means for transmitting, by the small cell, the MBSFN signal on the PMCH based on the determination.

14. An apparatus for wireless communication, comprising:
    a memory; and
    at least one processor coupled to the memory and configured for:
        receiving, at a small cell, a wireless Multicast-Broadcast Single Frequency Network (MBSFN) signal from a macro cell, wherein the small cell is characterized by having a transmit power substantially less than each macro cell in a wireless communication network with the small cell, wherein the small cell is not transmitting on a Physical Multicast Channel (PMCH);
        obtaining, by the small cell, a signal strength of the MBSFN signal within a radio range of the small cell;
        determining, by the small cell, that the signal strength of the MBSFN signal does not meet or exceed a threshold signal strength value sufficient for PMCH decoding; and
        transmitting, by the small cell, the MBSFN signal on the PMCH based on the determination.

15. The apparatus of claim 14, wherein the processor is further configured for reporting at least one of MBSFN transmission status, MBSFN transmit power, and unicast transmission status of the small cell to a Multicast Coordinating Entity (MCE).

16. The apparatus of claim 14, wherein the processor is further configured for determining a data quality requirement based on at least one of: a data rate Modulation and Coding Scheme (MCS) used in the MBSFN signal, or a data rate MCS used by a user equipment (UE) receiving the MBSFN signal within radio range of the small cell.

17. The apparatus of claim 14, wherein the processor is further configured for modulating power of MBSFN symbols transmitted by the small cell based on a data quality requirement.

18. The apparatus of claim 14, wherein the processor is further configured for performing the obtaining by measuring a metric of the MBSFN signal as received at the small cell, using a metric selected from Reference Signal Received Power (RSRP), Reference Signal Received Quality (RSRQ), or Signal-to-Noise Ratio (SNR).

19. The apparatus of claim 14, wherein the processor is further configured for performing the obtaining by receiving information from a user equipment (UE) in radio range of the small cell.

20. The apparatus of claim 19, wherein the processor is further configured for the receiving the information comprising a report indicating at least one of: a UE interest in an MBSFN service, or an MBSFN signal strength.

21. The apparatus of claim 19, wherein the processor is further configured for receiving the information via a Physical Random Access Channel (PRACH) signal from the UE.

22. The apparatus of claim 14, wherein the processor is further configured for setting a transmit power for transmitting the MBSFN signal from the small cell.

23. The apparatus of claim 22, wherein the processor is further configured for setting the transmit power by ramping up the transmit power based on a number of contiguous MBSFN subframes to be transmitted from the small cell.

24. A non-transitory computer-readable medium storing computer executable code, comprising code to:
- receive, at a small cell, a wireless Multicast-Broadcast Single Frequency Network (MBSFN) signal from a macro cell, wherein the small cell is characterized by having a transmit power substantially less than each macro cell in a wireless communication network with the small cell, wherein the small cell is not transmitting on a Physical Multicast Channel (PMCH);
- obtain, by the small cell, a signal strength of the MBSFN signal within a radio range of the small cell;
- determine by the small cell, that the signal strength of the MBSFN signal does not meet or exceed a threshold signal strength value sufficient for PMCH decoding; and
- transmit, by the small cell, the MBSFN signal on the PMCH based on the determination.

* * * * *